E. L. KRAG.
METALLIC BOOK STACK.
APPLICATION FILED MAY 31, 1907. RENEWED FEB. 21, 1912.
1,030,472.
Patented June 25, 1912.
4 SHEETS—SHEET 1.
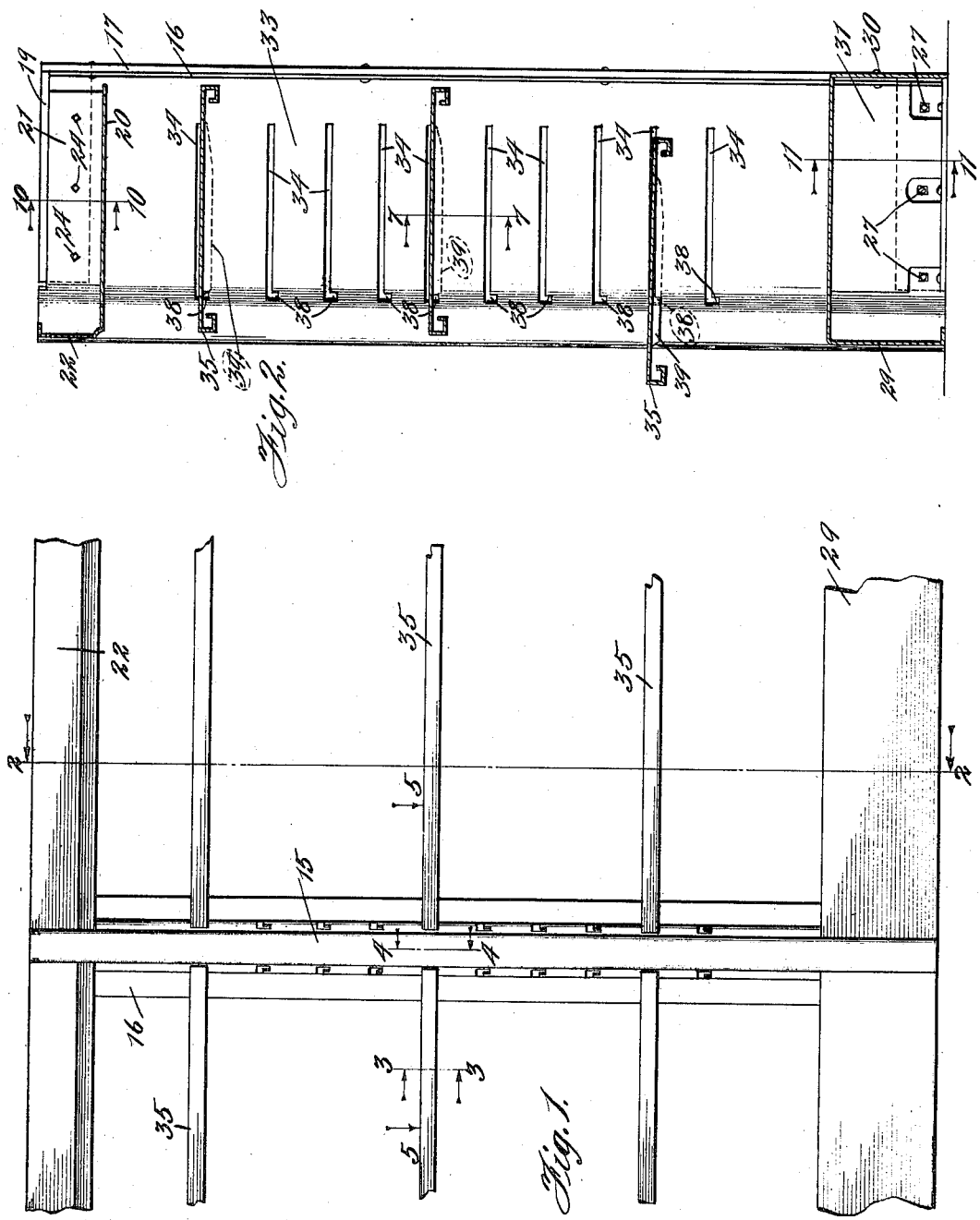

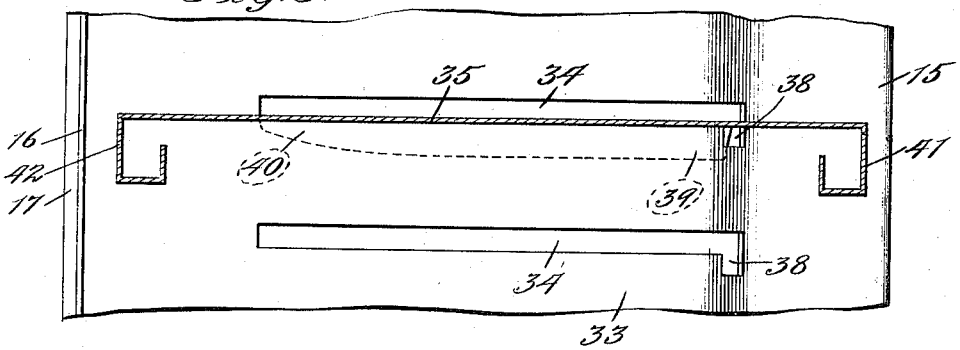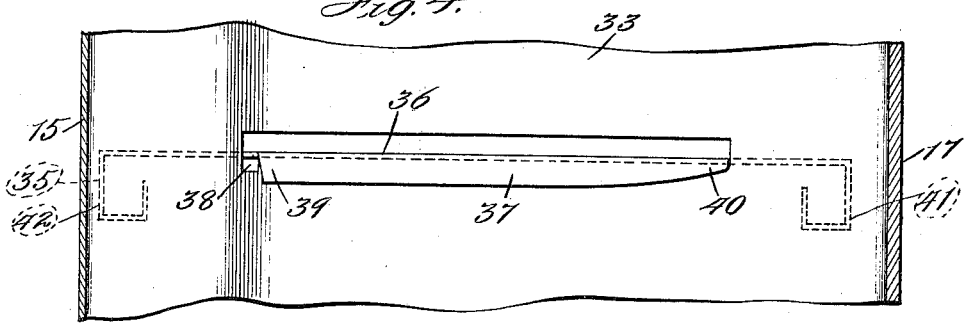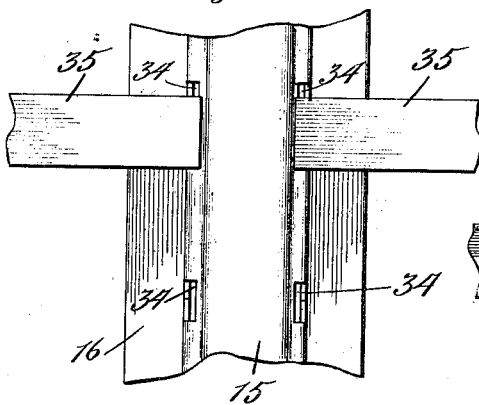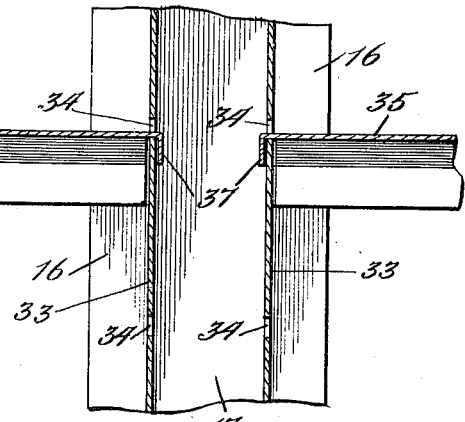

E. L. KRAG.
METALLIC BOOK STACK.
APPLICATION FILED MAY 31, 1907. RENEWED FEB. 21, 1912.
1,030,472.
Patented June 25, 1912.
4 SHEETS—SHEET 3.
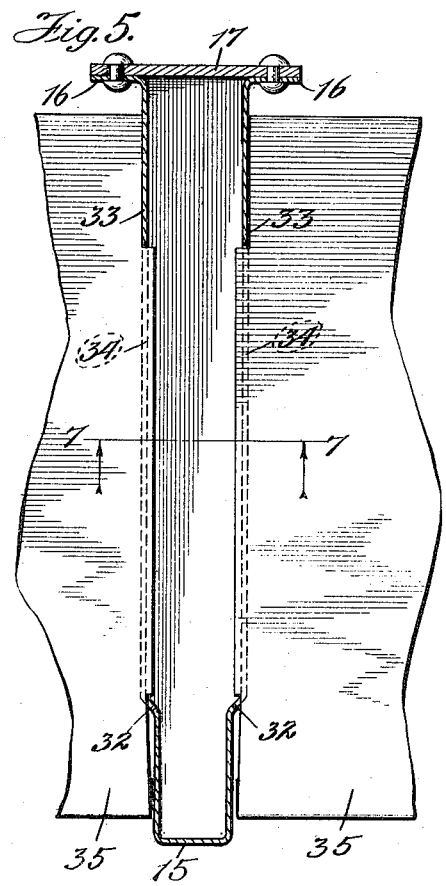
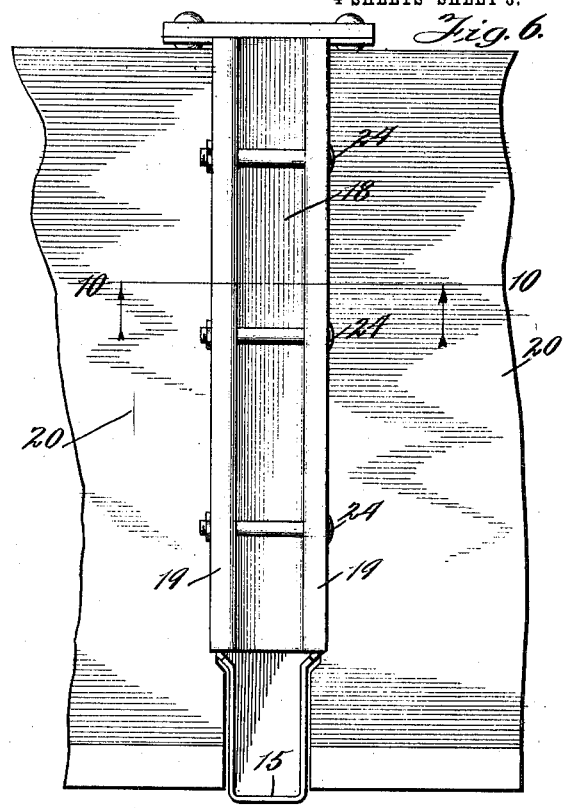
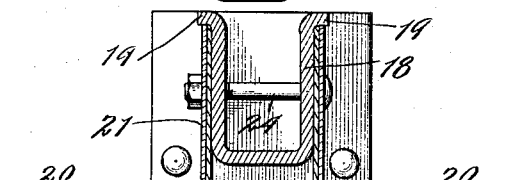
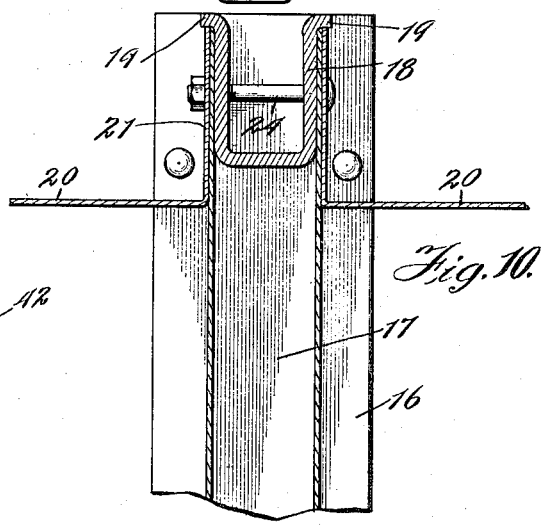
Witnesses:
Ira D. Perry
C. L. Hopkins
Inventor:
Erik L. Krag,
By Jones, Addington & Ames,
Attys.

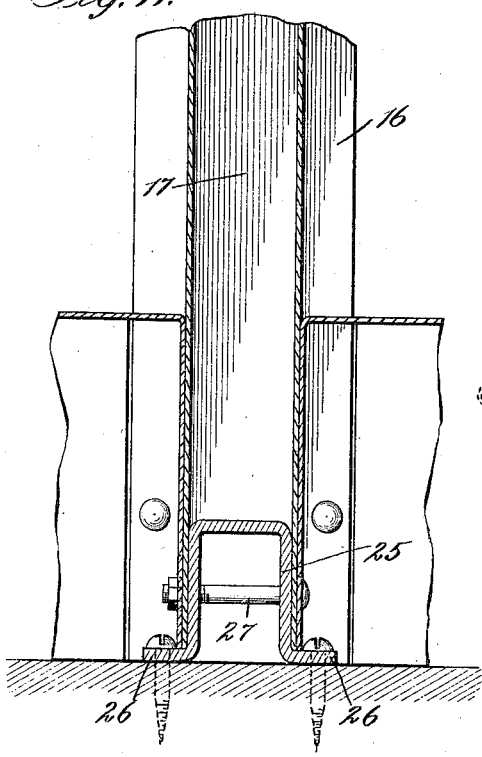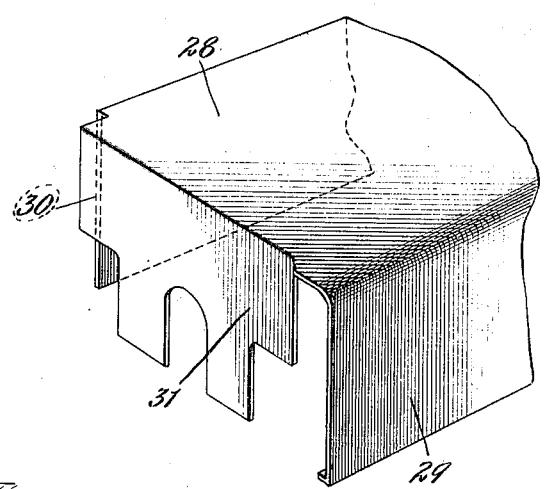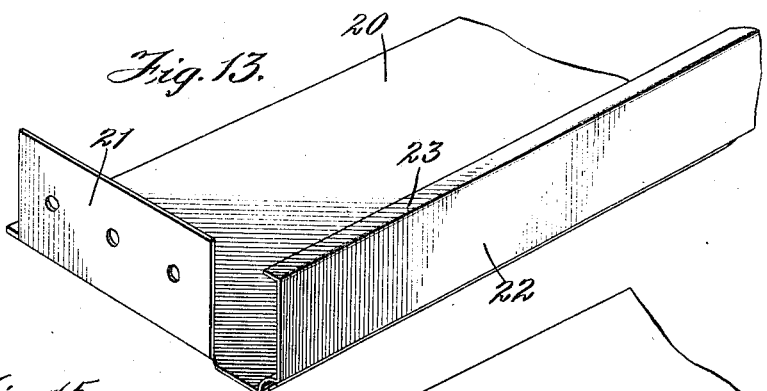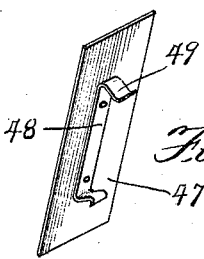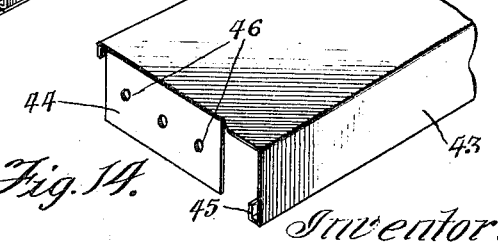

UNITED STATES PATENT OFFICE.

ERIK L. KRAG, OF CHICAGO, ILLINOIS, ASSIGNOR TO R. W. PALTRIDGE AND W. L. PROPER, OF CHICAGO, ILLINOIS.

METALLIC BOOK-STACK.

1,030,472.   Specification of Letters Patent.   Patented June 25, 1912.

Application filed May 31, 1907, Serial No. 376,596.   Renewed February 21, 1912.   Serial No. 679,188.

*To all whom it may concern:*

Be it known that I, ERIK L. KRAG, a citizen of the United States, residing at Chicago, in the county of Cook and State of Illinois, have invented new and useful Improvements in Metallic Book-Stacks, of which the following is a full, clear, concise, and exact description, reference being had to the accompanying drawing, forming a part of this specification.

This invention relates to improvements in metallic book-stacks such as are used in public libraries and other places where it is desirable to provide a book-stack of fire-proof construction and one which may be manufactured in sections adapted to be assembled to form a stack of any desired length, and one in which the shelves may be placed at various heights.

One of the principal objects of the invention is the provision of such a book-stack in which the shelves may be readily inserted and removed to change them to different vertical positions, and in which these shelves are normally locked against being drawn forward and out of the standards.

A further object is the provision of a metallic book-stack having an improved appearance.

A still further object is to provide a metallic book-stack which may be made up in sectional form and which, when the parts thereof are assembled and secured together, will form an exceedingly substantial structure.

In the accompanying drawings in which I have shown the preferred embodiment of my invention, Figure 1 is a broken elevational face view of a portion of a book stack embodying the features of my invention, showing one of the upright standards, and one end of each of the shelves supported thereby; Fig. 2 is a vertical sectional view of the same, the section being taken on the line 2—2 of Fig. 1, looking in the direction indicated by the arrows and showing the standard in side elevation; Fig. 3 shows a vertical section through one of the shelves on the line 3—3 of Fig. 1 looking in the direction indicated by the arrows; Fig. 4 is a vertical sectional view, the section being taken on the line 4—4 of Fig. 1, looking in the direction indicated by the arrows; Fig. 5 shows a horizontal section on the line 5—5 of Fig. 1, looking downward; Fig. 6 is a broken top plan view; Fig. 7 is a vertical sectional view, the section being taken on the line 7—7 of Figs. 2 and 5; Fig. 8 is a front elevation detail view; Fig. 9 is a perspective view of one end of a shelf; Fig. 10 is a vertical sectional view, the section being taken on the line 10—10 of Figs. 2 and 6, looking in the direction indicated by the arrows; Fig. 11 shows a vertical section on the line 11—11 of Fig. 2; Fig. 12 is a perspective view of one end of the base board of the device; Fig. 13 is a perspective view of an end of one form of top board or canopy used with the device; Fig. 14 is a similar view of another style of canopy; Fig. 15 is a perspective view of a part that is employed to cover the upper end of the standard when the stack is made low.

In the several figures of the drawings, in which like reference characters indicate the same parts throughout, 15 is a hollow upright standard, consisting of a strip of metal folded to present in cross-sectional form a substantially U-shape. The vertical edges of this strip are turned outward at 16 and to these outturned edges is secured by rivets or the like a strip 17, this strip serving to close the space between the legs of the U and to form therewith a substantial structure.

Inserted into the upper end of the hollow standard is a U-shaped plate 18, the legs of which project upward beyond the top of the strip 15 and are bent over outwardly at 19, 19. The upper ends of two adjacent standards are spaced apart and secured to each other by a sheet metal canopy 20, shown in perspective in Fig. 13. This canopy is formed with upturned ends 21 and an upturned front 22 provided with an inturned upper edge 23. Bolts 24 extend through the member 15, U-shaped plate 18, and upturned canopy ends 21, and secure the whole firmly together. Inserted into the lower end of each of the standards is a U-shaped plate 25, having outturned lower edges 26 which are secured to the floor by screws or the like. Bolts 27 extend through the sides of the standard and the U-shaped plate 25 so that when the plate 25 is secured to the floor a rigid and fixed structure is provided. A base 28, formed of sheet metal, is laid upon the floor between each pair of adjacent standards. This base forms the lower shelf of the stack and is provided with a downwardly-extending front 29 and back 30, resting upon the floor, and downwardly-extending ends 31, cut away as shown in Figs. 2 and 12 to admit the heads of the bolts 27.

The metal of the standard is drawn in at 32, 32, as best shown in Figs. 5 and 6, so that the thickness of the standard for a portion of its width is made less than that of the main body thereof. By such a construction there is provided a standard having a raised panel 33 on one or both sides thereof. The raised panel 33 is provided with a series of horizontally extending slots 34 for the reception of the ends of the shelves 35. Each shelf has upon each of its ends a projection 36 and upon the outer edge of this projection a downturned flange 37, adapted to hook over the lower edge of the slot 34. To permit this flange or hook 37 to enter the slot from the forward end of said slot, there are provided short vertical slots or notches 38 cut in the stepped portion 32 connecting the raised panel 33 and the thinner front portion of the standard. These notches 38 extend into the slots 34. The downturned portion of the projection on the shelf is made to extend downwardly far enough so that when the shelf has been pushed into its proper position the lower edge of this projection will be lower than the lower end of the notch 38. Withdrawal of the shelf is normally prevented by the engagement of the corner 39 of the shelf with the metal at the lower end of the notch 38. When the shelf is to be withdrawn the front edge thereof will first be lifted to enable the corner 39 to pass over the lower end of the notch 38, whereupon the shelf may be readily removed.

To facilitate the insertion of the shelf the corner at the inner or rear end of the flange on the shelf may be rounded as shown at 40. To lend stiffness to the shelves their front and rear edges may be rolled under as shown at 41 and 42. This construction adds also a substantial and attractive appearance to the device. In cases where the book-stack is made low, so that the top of the canopy is below the level of the eye of a person, the form of canopy shown in Fig. 14 will be used. In this style of canopy the front 43 and ends 44 are turned down, as shown, instead of up as in the style of canopy shown in Fig. 13. The lower edge 45 of the front 43 is bent inward and upward to lend an appearance of thickness and to add stiffness to the device. The ends 44 are provided with holes 46 for the bolts 24. To cover the upper end of the standard, especially when the stack is made low, a plate 47 is provided, this plate being made wide enough to extend over the ends of the canopy. To secure this plate in place, a strip 48, of slightly resilient metal, is secured to the under side of the plate and is formed with curved or hooked ends 49 adapted to hook under the bolts 24.

Having thus described my invention, what I claim as new and desire to secure by Letters Patent is:

1. In a book stack, a standard formed of sheet metal and bent to form two panels, one raised relatively to the other, the raised panel being formed with a plurality of transverse slots for the reception of shelves, said slots extending to the part of said raised panel at which it is bent down to join the other panel and being enlarged at this point to enable the shelves to be inserted endwise into said slots.

2. In a book stack, a standard formed of sheet metal and bent to form two vertical panels, one raised relatively to the other, the raised panel being formed with a plurality of horizontal slots for the reception of shelves, said slots extending to the part of said raised panel at which it is bent down to join the other panel and being extended downwardly at this point to form short vertical slots to enable the shelves to be inserted endwise into said horizontal slots.

3. The combination with a standard having a hollow raised panel, said panel being provided with a horizontal slot, a shelf adapted to rest upon the lower side of said slot and having a downwardly extending portion within said panel, said panel having a notch to permit the insertion of said shelf into said slot, said notch being of such dimensions as to normally prevent removal of said shelf and to permit such removal upon the raising of said shelf from the lower side of said slot.

4. The combination of a standard having a hollow panel, the face of said panel having a horizontal slot, a shelf resting upon the lower side of said slot, the edge of said panel being provided with a notch having its bottom below the lower side of said slot, and said shelf having a downwardly extending portion within said panel extending below the bottom of said notch, whereby said shelf is normally held from withdrawal from said slot.

5. In a book stack, the combination of a standard having a raised panel provided with horizontal slots, and a sheet metal shelf having its end bent downwardly and adapted to enter a slot, said standard having also short vertical slots intersecting said horizontal slots to permit the insertion of said downwardly bent ends into said horizontal slot.

6. In a book stack, the combination of a shelf having a projection on its end and a downturned flange on said projection, and a hollow standard formed of a sheet of metal, bent upon itself, and having a raised panel provided with horizontal slots and with short vertical slots meeting said horizontal slots to permit the insertion of said projection into said slot.

7. In a metallic book stack, a hollow standard consisting of an upright metallic strip U-shaped in horizontal cross-section, a strip secured thereto and arranged to span the open side of said U-shaped strip, a U-shaped plate inserted into the upper end of said U-shaped strip and means extending through said U-shaped strip and the ends of said U-shaped plate and securing the same together.

8. The combination of a hollow standard having a raised panel provided with transverse slots, and shelves having downturned ends for insertion into said slots, said panel having also short vertical slots intersecting said horizontal slots to permit the insertion of the ends of said shelves, said vertical slots being so formed as to normally prevent the removal of said shelves.

9. In a metallic book stack, a hollow standard comprising a metallic strip U-shaped in horizontal cross-section, a strip arranged to span the opposite edges of said U-shaped strip, and a U-shaped plate inserted into the lower end of said U-shaped strip and having the legs thereof projecting from said U-shaped strip and turned outwardly to provide feet for securing the same in place.

10. The combination of a standard, a hollow raised panel on said standard having its face formed with a horizontal slot, a shelf having an end insertible into said slot, and a downwardly-extending portion on said end within said panel, the edge of said panel being notched to permit the insertion of said shelf into said slot, and said downturned portion on said shelf extending below the lower limit of said notch to prevent accidental removal of said shelf.

11. A hollow metallic standard having a raised panel provided with slots, a shelf having a hooked end adapted to be inserted into a slot, and means normally locking said shelf against removal from said slot but permitting such removal upon upward movement of the edge of said shelf.

In witness whereof, I have hereunto subscribed my name in the presence of two witnesses.

ERIK L. KRAG.

Witnesses:
R. W. CLARK,
C. L. HOPKINS.